United States Patent [19]

Shimo

[11] Patent Number: 5,193,218
[45] Date of Patent: Mar. 9, 1993

[54] SIGNAL TRANSMISSION RECEPTION SWITCHING APPARATUS

[75] Inventor: Norio Shimo, Kanagawa, Japan

[73] Assignee: Sony Corporation, Tokyo, Japan

[21] Appl. No.: 664,214

[22] Filed: Mar. 4, 1991

[30] Foreign Application Priority Data

Mar. 8, 1990 [JP] Japan .................. 2-057676

[51] Int. Cl.$^5$ ............................. H04B 1/46
[52] U.S. Cl. ........................ 455/80; 455/81; 455/82; 455/83
[58] Field of Search .............. 455/78, 79, 80, 81, 455/82, 83

[56] References Cited

U.S. PATENT DOCUMENTS

| | | | |
|---|---|---|---|
| 3,327,215 | 6/1967 | Battin et al. | 455/83 |
| 3,339,140 | 8/1967 | Pace | 455/78 |
| 4,399,557 | 8/1983 | Muszkiewicz | 455/82 |
| 5,023,935 | 6/1991 | Vancraeynest | 455/83 |
| 5,060,293 | 10/1991 | Kok et al. | 455/83 |

Primary Examiner—Reinhard J. Eisenzopf
Assistant Examiner—Timothy H. Keough
Attorney, Agent, or Firm—Philip M. Shaw, Jr.

[57] ABSTRACT

A signal switching apparatus for switching between a ¼ wavelength transmission line, which transmits a transmission signal, and a ¼ wavelength reception line, which receives a reception signal, which share a common antenna. The apparatus sets the characteristic impedance of one of the ¼ wavelength lines to be zero while the other ¼ wavelength lines is set to infinity so that the switching operation can be effected without passing the transmission and reception signals through semiconductor switches.

8 Claims, 6 Drawing Sheets

SIGNAL TRANSMISSION RECEPTION SWITCHING APPARATUS

BACKGROUND OF THE INVENTION

1. Field of the Invention

The present invention generally relates to a switching apparatus and, more particularly, is directed to a signal transmission reception switching apparatus.

2. Description of the Prior Art

Generally, in a cordless telephone, a telephone communication is carried out in a so-called bidirectional fashion so that the transmission of its own audio signal and the reception of an audio signal from the other party are constantly performed simultaneously.

To this end, as shown in FIG. 1, in the cordless telephone, a transmitting circuit 1 and a receiving circuit 2 are connected to an antenna 4 through a separating circuit 3 which is what might be called a duplexer.

The duplexer 3 is generally composed of a bandpass filter whose pass band is the frequency of a transmitting signal and a bandpass filter whose pass band is the frequency of a receiving signal. This method utilizing the duplexer 3 is effective when the transmitting frequency and the receiving frequency are considerably distant from each other.

In a digital mobile telephone set, for example, a digital mobile telephone now commercially available on the market of the United States, the transmitting frequency and the receiving frequency are 800 to 900 MHz, respectively, and a difference between the transmitting frequency and the receiving frequency is 45 MHz at any one of the channels. Accordingly, if the transmitting circuit 1 and the receiving circuit 2 are connected through the duplexer 3 to the antenna 4, cut-off frequency characteristics of the bandpass filters of the duplexer 3 must be made steep because the transmitting frequency and the receiving frequency are both high and they are close to each other. However, the bandpass filters having such steep cut-off frequency characteristics cannot be produced without difficulty from a technological standpoint, which increases the loss of signals and the increases of size, weight and cost of the digital mobile telephone.

In the digital mobile telephone system, although the telephone conversation is performed in a bidirectional manner, the transmission of its own audio signal and the transmission of the audio signal from the other party are performed in a time division multiple access (TDMA) system. Therefore, as shown in FIG. 2, the transmitting circuit 1 and the receiving circuit 2 are switched by a change-over circuit (switching circuit) 5 and then can be connected to the antenna 4.

The switching circuit 5 is generally constructed as, for example, shown in FIG. 3.

In FIG. 3, reference numerals 11, 12 and 13 denote PIN (positive-intrinsic-negative) diodes, and 21, 22, 23 and 24 ¼ wavelength coaxial lines, respectively. Upon transmission, the diode 11 is turned OFF and the diodes 12, 13 are turned ON, whereas upon reception, the diode 11 is turned ON and the diodes 12, 13 are turned OFF.

In the switching circuit 5 shown in FIG. 3, however, the diodes 11, 12 and 13 have a relatively large resistance value so that Q is lowered, thus making it impossible to obtain a high isolation.

Further, since the transmission signal is passed through the diode 12, which has a large resistance value, a transmission loss occurs in the transmission signal, thereby causing an antenna output to be lowered. Furthermore, since the isolation is low, the transmission signal is also leaked to the receiving circuit 2 side, thereby increasing the transmission loss.

Alternatively, in order to obtain a proper antenna output, the transmitting circuit 1 must transmit a larger transmission output, which is disadvantageous for a power supply source battery. Furthermore, since the transmission loss in the diode 12 is large, the diode 12 must be able to withstand a large voltage, which increases a manufacturing cost of the switching circuit 5.

In addition, since a loss occurs in the receiving signal due to the diode 13, a reception sensitivity is lowered.

OBJECTS AND SUMMARY OF THE INVENTION

Accordingly, it is an object of the present invention to provide an improved signal transmission reception switching apparatus in which the aforenoted shortcomings and disadvantages encountered with the prior art can be eliminated.

More specifically, it is an object of the present invention to provide a signal transmission reception switching apparatus in which higher isolation can be obtained.

It is another object of the present invention to provide a signal transmission reception switching apparatus in which a transmission loss can be prevented from being produced in a transmission signal.

It is still another object of the present invention to provide a signal transmission reception switching apparatus which can be made inexpensive.

It is a further object of the present invention to provide a signal transmission reception switching apparatus in which a reception sensitivity can be prevented from being lowered.

In accordance with an aspect of the present invention, a signal transmission reception switching apparatus is provided, in which a transmission signal and a reception signal are selectively switched to access an antenna. This signal transmission reception switching apparatus is comprised of a first transmission line connected between a transmission terminal from which the transmission signal is supplied and an antenna terminal, a first switching element connected to ground, a second transmission line connected between the transmission terminal and the first switching element, a third transmission line connected between the antenna terminal and a reception terminal to which the reception signal is supplied, a second switching element connected to ground, and a fourth transmission lines connected between the reception terminal and the second switching element. The first, second, third, and fourth transmission lines each have a length which is substantially ¼ of a wavelength of the average wavelength of the transmission and reception signals. In operation, when the first switching element is ON and the second switching element is OFF, the impedance seen from the output of the first transmission line is substantially zero, while the impedance seen from the output of the third transmission line is substantially infinity. Similarly, when the first switching element is OFF and the second switching element is ON, the impedance seen at the output of the first transmission line is substantially infinity, while the impedance seen at the output of the third transmission line is substantially zero.

The above, and other objects, features and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Prior to describing the signal transmission reception switching apparatus of the present invention, a fundamental principle of the present invention will be explained below with reference to FIGS. 4A to 4C.

Figure 1:
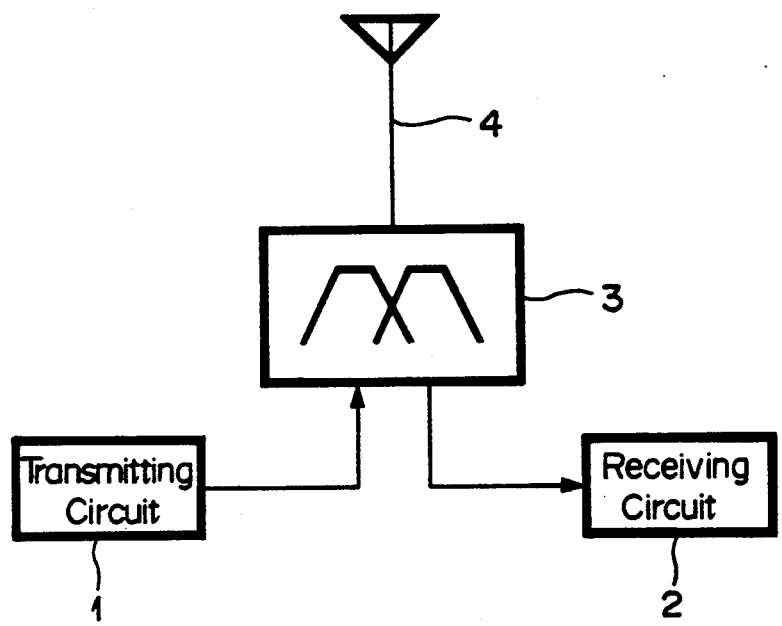
FIG. 1 is a schematic diagram showing an example of a cordless telephone system.
Figure 2:
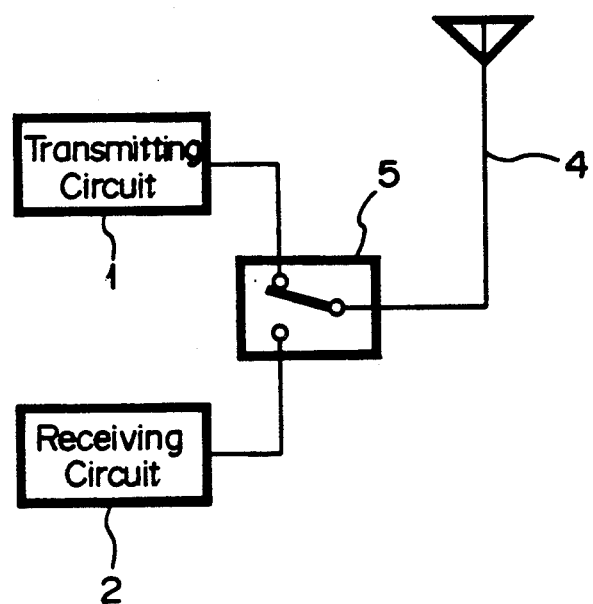
FIG. 2 is a schematic diagram showing an example of a digital mobile telephone system.
Figure 3:
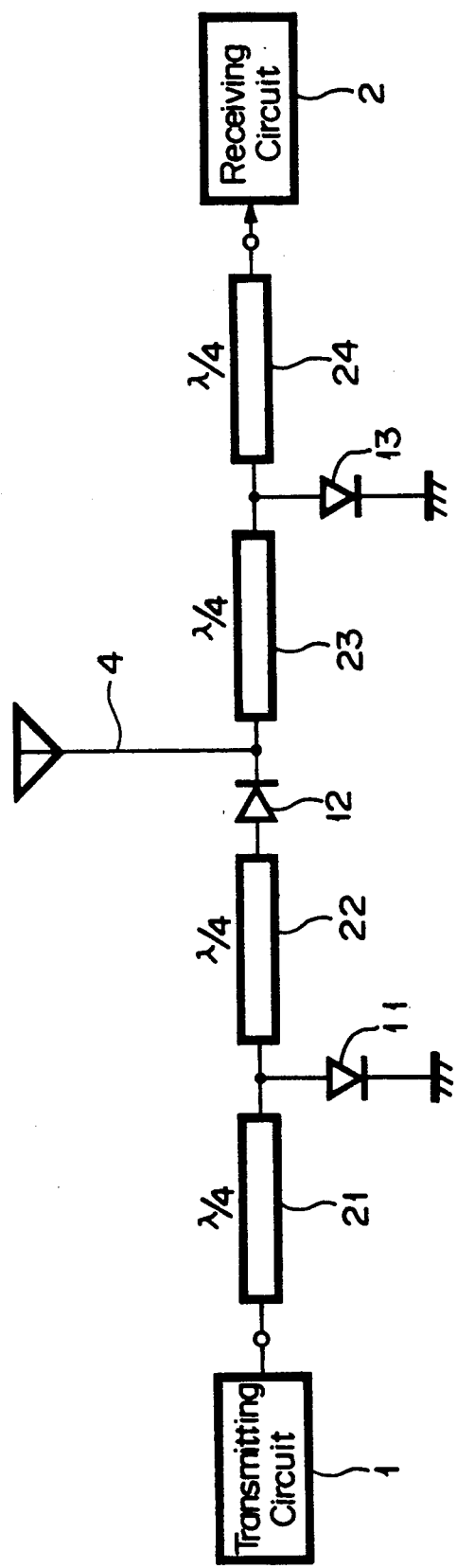
FIG. 3 is a schematic diagram showing a switching circuit used in the digital mobile telephone system shown in FIG. 2.
Figure 4A:
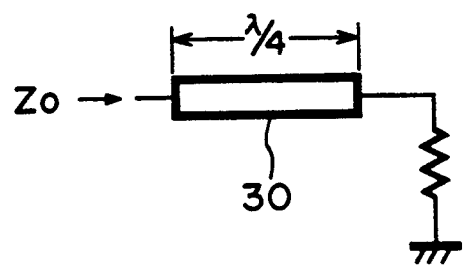
FIGS. 4A, 4B and 4C are schematic diagrams used, respectively, to explain a fundamental principle of the present invention.

As shown in FIG. 4A, a length (effective length) of a coaxial line 30 is selected to be ¼ of a wavelength λ of a signal, and if an impedance Zo equal to a characteristic impedance of this coaxial line 30 is connected to an output end of the coaxial line 30 as shown in FIG. 4A, the impedance becomes value Zo when seen from the input end of the coaxial line 30.

Figure 4B:
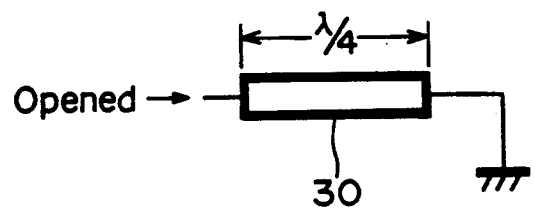

If the output end of the coaxial line 30 is short circuited as shown in FIG. 4B, then the impedance becomes infinity (opened) when seen from the input end of the coaxial line 30.

Figure 4C:
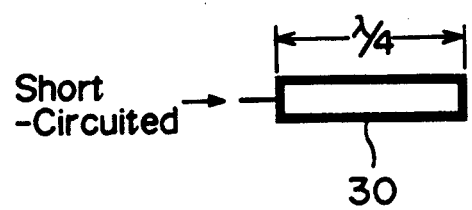

Further, if the output end of the coaxial line 30 is opened as shown in FIG. 4C, then the impedance becomes zero (short) when seen from the input end of the coaxial line 30.

In the case of the digital mobile telephone system, as described above, the transmitting frequency and the receiving frequency are high and a difference therebetween is as sufficiently small as about 5% as compared with the transmitting frequency and the receiving frequency.

In view of the above-mentioned aspects, the present invention is intended to provide the signal transmission reception switching apparatus in which the coaxial line itself is utilized as a switch for switching the connection to an antenna.

A first embodiment of the signal transmission reception switching apparatus according to the present invention will now be described with reference to FIG. 5 and FIGS. 6A to 6C.

Figure 5:
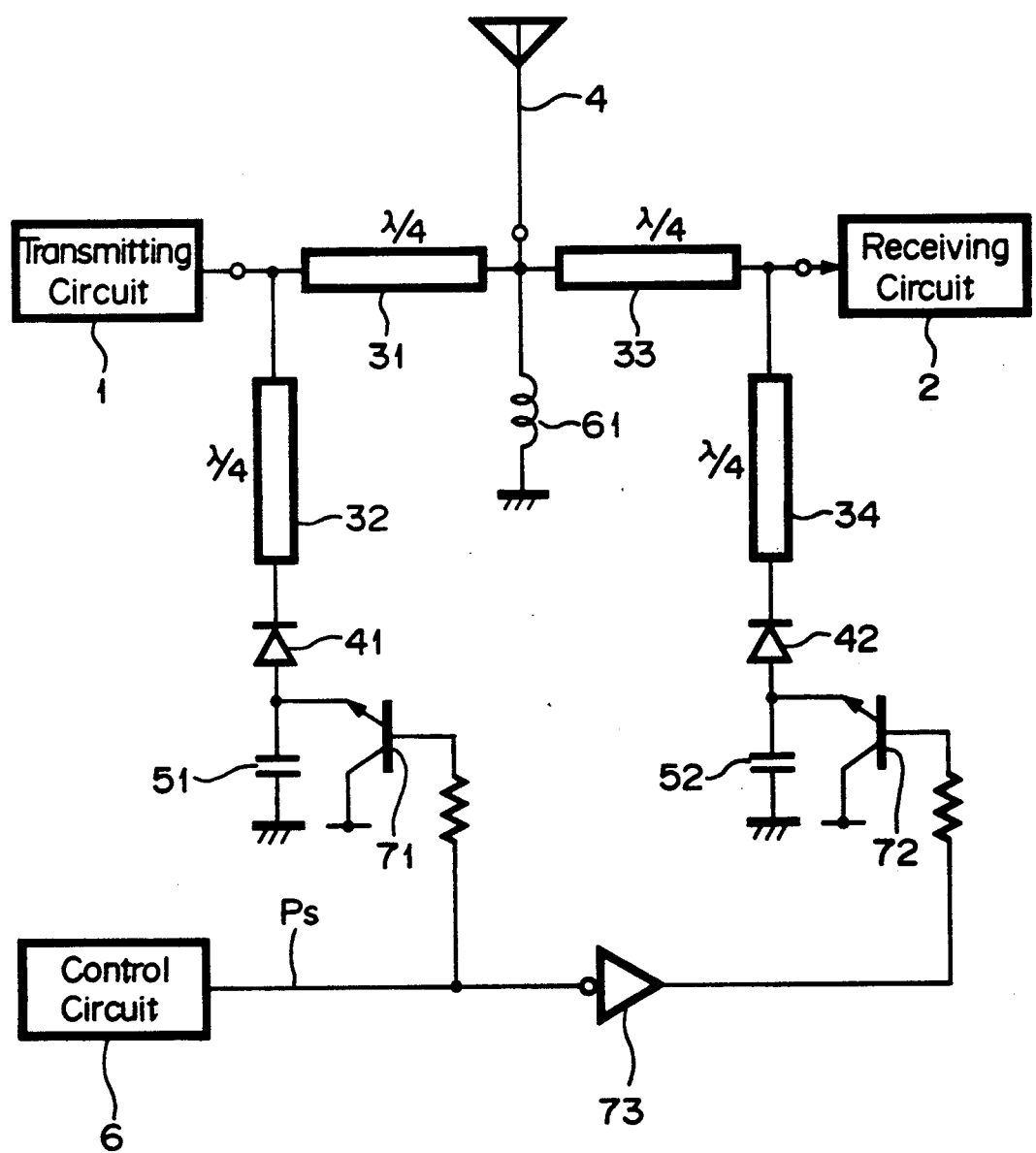
FIG. 5 is a schematic diagram showing a first embodiment of a signal transmission reception switching apparatus according to the present invention.

Referring to FIG. 5, an output terminal of a transmitting circuit 1 is connected to an antenna 4 through a coaxial line 31, and a coaxial line 32, a switching diode 41 and a bypass capacitor 51 are connected in series between the output terminal of the transmitting circuit 1 and the ground.

A coaxial line 33 is connected between the antenna 4 and the input terminal of a receiving circuit 2, and a coaxial line 34, a switching diode 42 and a bypass capacitor 52 are connected in series between the input terminal of the receiving circuit 2 and the ground.

A high frequency choke coil 61 for a DC line is connected between the antenna 4 and the ground, and also an emitter-collector path of a switching transistor 71 is connected between a junction P1 of the switching diode 41 to the bypass capacitor 51 and a power supply source line. Further, an emitter-collector path of a switching transistor 72 is connected between a junction P2 of the switching diode 42 to the bypass capacitor 52 and the power supply source line.

Characteristic impedances of the respective coaxial lines 31 to 34 are made equal to an output impedance of the transmitting circuit 1, an impedance of the antenna 4 and an input impedance of the receiving circuit 2, and also a length (effective length) of each of the coaxial lines 31 to 34 is selected to be ¼ of an average wavelength λ of transmission and reception wavelengths. Further, the switching diodes 41 and 42 are formed of PIN diodes, respectively.

A control circuit 6 derives a switching pulse Ps which goes high level "1" during a transmission period of the TDMA system and which goes low level "0" during a reception period thereof. This switching pulse Ps is supplied to the base of the transistor 71 and is also supplied through an inverter 73 to the base of the transistor 72.

Figure 6A:
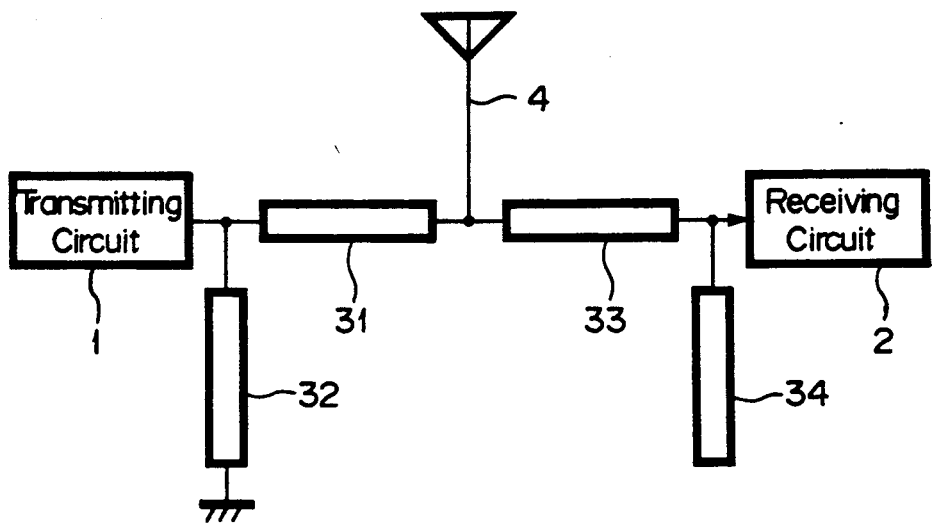
FIGS. 6A, 6B and 6C are diagrams of equivalent circuits, respectively, of the first embodiment of the signal transmission reception switching apparatus according to the present invention.

According to the above-mentioned arrangement, when Ps="1" is established in the transmission period, the transistor 71 is turned ON and the switching diode 41 is turned ON accordingly so that, as shown by its equivalent circuit in FIG. 6A, the coaxial line 32 is grounded at its end portion opposing to the diode 41 side via the switching diode 41 and the bypass capacitor 51 from a high frequency standpoint. At that time, since Ps="1" is established, the transistor 72 is turned OFF and the switching diode 42 is turned OFF accordingly, thereby the coaxial line 34 being opened at its end portion opposing the switching diode 42 side.

Figure 6B:
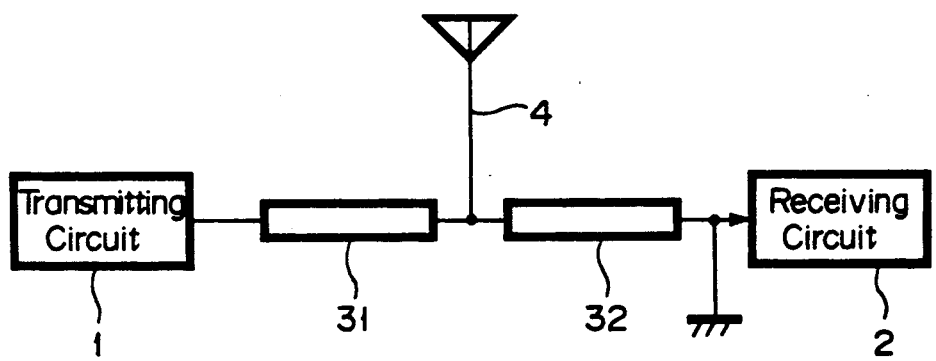
Figure 6C:
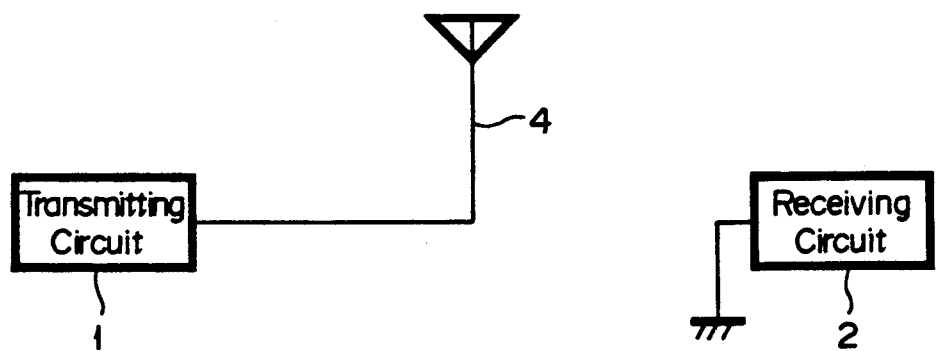

Accordingly, the equivalent circuit of FIG. 6A can be rewritten as an equivalent circuit shown in FIG. 6B on the basis of the fundamental principle as earlier noted with reference to FIGS. 4A to 4C, and further, the equivalent circuit of FIG. 6A can be rewritten as an equivalent circuit shown in FIG. 6C.

Therefore, the output terminal of the transmitting circuit 1 is connected to the antenna 4 and the input terminal of the receiving circuit 2 is grounded, whereby the transmission is performed.

When Ps="0" is established in the reception period, the transistor 71 is turned OFF, the switching diode 41 is also turned OFF while the transistor 72 is turned ON so that the switching diode 42 is turned ON.

Accordingly, in an opposite manner to that of the transmission period, the output terminal of the transmitting circuit 1 is grounded and the antenna 4 is connected to the input terminal of the receiving circuit 2.

As described above, according to the first embodiment of this invention, the transmitting circuit 1 and the receiving circuit 2 are selectively connected to the antenna 4. Particularly, in accordance with the first embodiment of the present invention, the coaxial lines 31 to 34 are given switching functions to thereby switch the signal transmission and reception so that Q can be prevented from being lowered. Therefore, the closer the transmitting and receiving frequencies become, which provides a disadvantage in the general switching apparatus, the higher the isolation can be made.

Further, since the transmission signal does not pass through the switching diodes 41 to 42 having large resistance values, a transmission loss can be prevented from being produced in the transmission signal and hence the antenna output can be prevented from being lowered. Furthermore, since the isolation is high, the transmission signal can be prevented from being leaked to the receiving circuit 2 side and a transmission loss can be avoided also.

Alternatively, the transmission output of the transmitting circuit 1 need not be increased excessively in order to obtain a proper antenna output, which is advantageous for the power supply source battery. Further, since the transmission signal and the reception signal are prevented from passing through the switching diodes 41 and 42, the switching diodes 41 and 42 might be such ones having small power withstand property, which can reduce the manufacturing cost.

Furthermore, since a loss is prevented from being produced by the switching diodes 41 and 42, a reception sensitivity can be prevented from being lowered.

Figure 7:
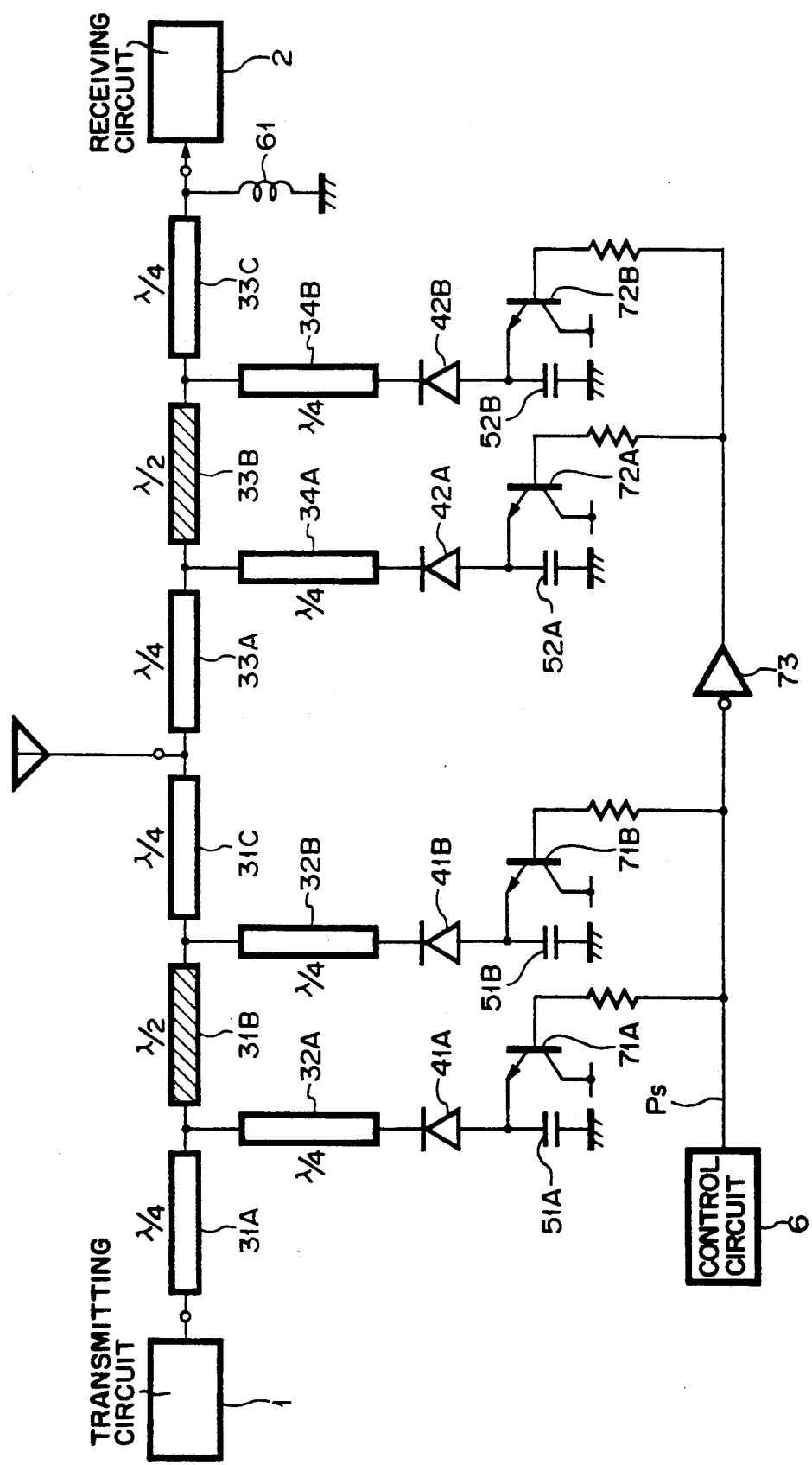
FIG. 7 is a schematic diagram showing a second embodiment of the signal transmission reception switching apparatus according to the present invention.

FIG. 7 shows a second embodiment of the signal transmission reception switching apparatus according to the present invention, in which the switching circuits are constructed in a multiple-stage fashion.

As shown in FIG. 7, coaxial lines 31A to 34B, switching diodes 41A to 42B, bypass capacitors 51A to 52B and switching transistors 71A to 72B are connected in a multiple-stage fashion similarly to the coaxial lines 31 to 34, the switching diodes 41 and 42, the bypass capacitors 51 and 52 and the switching transistors 71 and 72. While the length of each of the coaxial lines 31A, 31C, 33A and 33C is selected to be ¼ of the average wavelength λ of the transmission and reception wavelengths, the length of each of the coaxial lines 31B and 33B is selected to be ½ of the average wavelength λ of the transmission and reception wavelengths. The length of each of the coaxial lines 32A, 32B, 34A and 34B is also selected to be λ/4.

According to the circuit arrangement of FIG. 7, since the length of each of the coaxial lines 31B and 33B is selected to be ½ of the average wavelength λ of the transmission and reception wavelengths as described above, impedance (opened or short circuited) of each of the output terminal is directly reflected on the input terminal thereof, whereby the transmitting circuit 1 and the receiving circuit 2 are selectively connected to the antenna 4 similarly as described above.

According to the second embodiment of the present invention, since the switching circuit is constructed in a multiple-stage fashion, isolation can be made higher. In addition, since the transmission signal and the reception signal are only transmitted through the coaxial lines 31A to 31C and 33A to 33C, respectively, loss can be avoided substantially.

Alternatively, in the second embodiment of FIG. 7, the coaxial lines 31B and 33B may be replaced with PIN diodes.

As described above, in accordance with the present invention, the coaxial lines 31 to 34 are given switching functions to thereby switch the signal transmission and reception so that Q can be prevented from being lowered. Therefore, the closer the transmitting and receiving frequencies become, which provides a disadvantage in the general switching apparatus, the higher the isolation can be made.

Further, since the transmission signal is not passed through the switching diodes 41 to 42 having large resistance values, a transmission loss can be prevented from being produced in the transmission signal and the antenna output can be prevented from being lowered. Furthermore, since the isolation is high, the transmission signal can be prevented from being leaked to the receiving circuit 2 side and a transmission loss can be avoided also.

Alternatively, the transmission output of the transmitting circuit 1 need not be increased excessively in order to obtain a proper antenna output, which is advantageous for the power supply source battery. Further, since the transmission signal and the reception signal are prevented from passing through the switching diodes 41 and 42, the switching diodes 41 and 42 might be such ones having small power withstand property, which can reduce the manufacturing cost.

Furthermore, since a loss is prevented from being produced by the switching diodes 41 and 42, a reception sensitivity can be prevented from being lowered.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A signal transmission reception switching apparatus in which a transmission signal and a reception signal are selectively switched to access an antenna, comprising:
    (a) a first transmission line connected between a transmission terminal from which the transmission signal is supplied and an antenna terminal, the first transmission line having a length substantially equal to ¼ of an average wavelength λ of the transmission and the reception signals;
    (b) a first switching element connected to ground;
    (c) a second transmission line connected between a transmission terminal and the first switching element, the second transmission line having a length substantially equal to ¼ of an average wavelength λ of the transmission and the reception signals;
    (d) a third transmission line connected between the antenna terminal and a reception terminal to which the reception signal is supplied, the third transmission line having a length substantially equal to ¼ of an average wavelength λ of the transmission and the reception signals;
    (e) a second switching element connected to ground;
    (f) a fourth transmission line connected between the reception terminal and the second switching element, the fourth transmission line having a length substantially equal to ¼ of an average wavelength λ of the transmission and the reception signals, wherein when the transmission signal is transmitted, the first switching element is turned ON and the second switching element is turned OFF, while when the reception signal is received, the first switching element is turned OFF and the second switching element is turned ON.

2. A signal transmission reception switching apparatus according to claim 1 wherein the first transmission line, the second transmission line, the third transmission line, and the fourth transmission line are coaxial lines.

3. A signal transmission reception switching apparatus according to claim 1 wherein the first switching element includes a switching diode and a switching transistor and the second switching element includes a switching diode and a switching transistor.

4. A signal transmission reception switching apparatus according to claim 3 wherein the switching diode of the first switching element comprises a PIN diode and wherein the switching diode of the second switching element comprises PIN diodes.

5. A signal transmission reception switching apparatus according to claim 1 wherein the first transmission line comprises an odd number of first transmission elements, the third transmission line comprises and odd number of third transmission elements, the second transmission line comprises an even number of second transmission elements one less in number than the odd number of first transmission elements, the fourth transmission line comprises an even number of fourth transmission elements one less in number than the odd number of third transmission elements, the first switching element comprises an even number of first switching subelements equal in number to the even number of second transmission elements, and the second switching element comprises an even number of second switching subelements equal in number to the even number of fourth transmission elements.

6. A signal transmission reception switching apparatus as claimed in claim 5, wherein the odd number of first transmission elements includes a first coaxial line, a second coaxial line, and a third coaxial line connected in series and wherein the odd number of third transmission elements includes a fourth coaxial line, a fifth coaxial line, and a sixth coaxial line connected in series.

7. A signal transmission reception switching apparatus as claimed in claim 6, wherein a length of the first coaxial line and the third coaxial line is substantially ¼ of an average wavelength $\lambda$ of the transmission and reception signals, while a length of the second coaxial line is substantially ½ of an average wavelength $\lambda$ of the transmission and reception signals.

8. A signal transmission reception switching apparatus as claimed in claim 7, wherein a length of the fourth coaxial line and the sixth coaxial line is substantially ¼ of an average wavelength $\lambda$ of the transmission and reception signals, while a length of the fifth coaxial line is substantially ½ of an average wavelength $\lambda$ of the transmission and reception signals.

* * * * *